United States Patent [19]
Wiese

[11] 3,957,276
[45] May 18, 1976

[54] MECHANICAL SEAL WITH PRESSURIZED LUBRICATION POCKETS

[75] Inventor: Winfred J. Wiese, Whittier, Calif.

[73] Assignee: Borg-Warner Corporation, Chicago, Ill.

[22] Filed: Apr. 10, 1975

[21] Appl. No.: 566,874

[52] U.S. Cl. ................................. 277/22; 277/96.1; 277/74
[51] Int. Cl.² ..................... F16J 15/00; F16J 15/34
[58] Field of Search ................. 277/96.1, 74, 67, 22

[56] References Cited
UNITED STATES PATENTS

| | | | |
|---|---|---|---|
| 2,247,505 | 7/1941 | Kohler | 277/74 |
| 3,147,013 | 9/1964 | Tracy | 277/67 |
| 3,227,463 | 1/1966 | Wiese | 277/96 X |
| 3,628,799 | 2/1971 | Wiese | 277/27 |
| 3,638,957 | 2/1972 | Marsi | 277/96 |
| 3,640,541 | 2/1972 | Taschenberg | 277/96.1 |

FOREIGN PATENTS OR APPLICATIONS

| | | | |
|---|---|---|---|
| 735,250 | 8/1955 | United Kingdom | 277/96 |
| 1,470,389 | 11/1938 | Germany | |
| 1,221,865 | 7/1966 | Germany | 277/96.1 |

Primary Examiner—Samuel B. Rothberg
Attorney, Agent, or Firm—Aubrey L. Burgess

[57] ABSTRACT

The relatively rotatable sealing faces of mechanical seal are provided with circumferentially spaced pockets which provide a path of fluid flow across the sealing faces during rotation of the rotatable sealing ring but no path when there is no relative rotation therebetween. The fluid flow enhances the lubrication and cooling of the faces.

8 Claims, 6 Drawing Figures

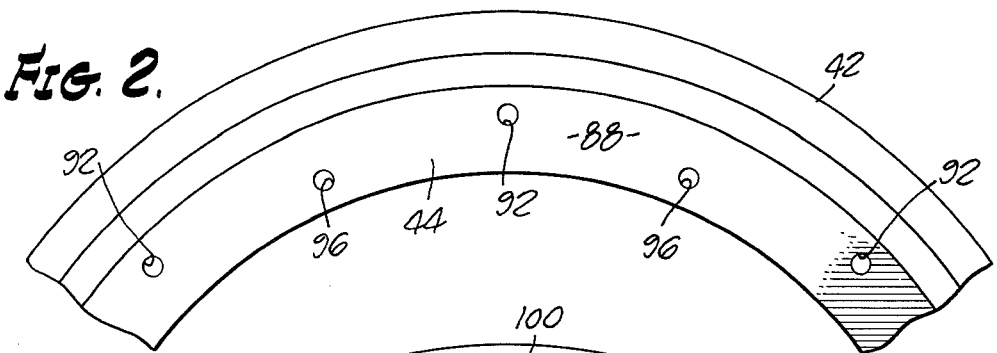
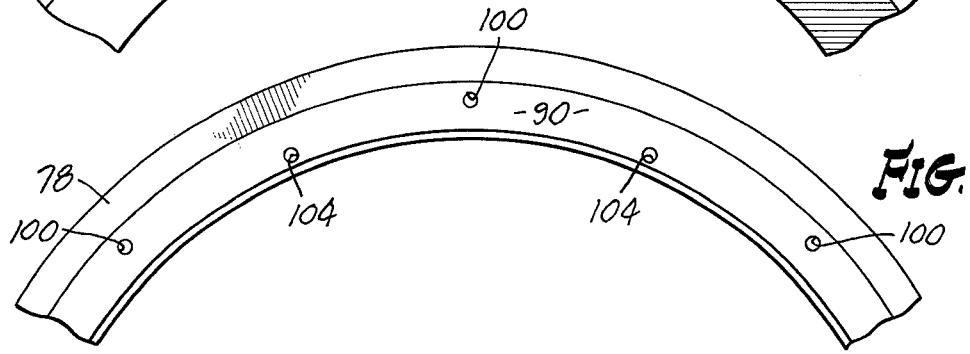
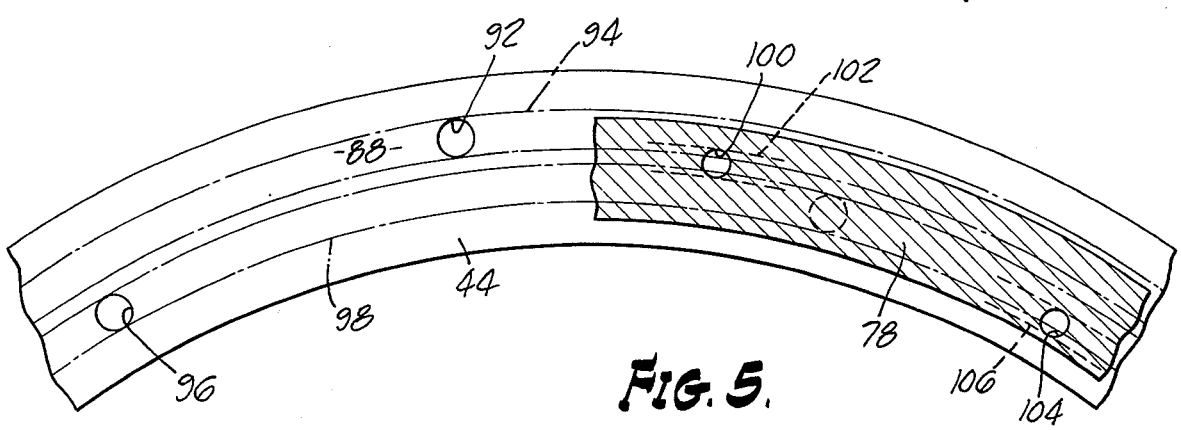
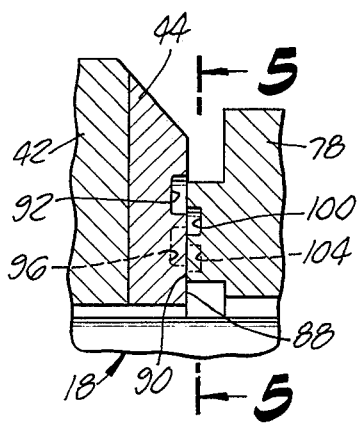
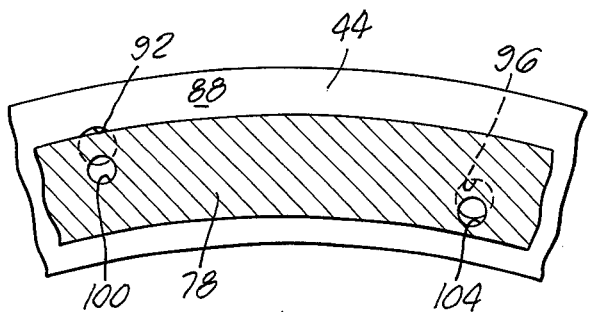

MECHANICAL SEAL WITH PRESSURIZED LUBRICATION POCKETS

BACKGROUND OF THE INVENTION

This invention relates to mechanical seals of the type used for sealing between a housing, such as a pump housing, and a rotating shaft, such as the pump impeller shaft, such seals employing relatively rotating sealing elements which have contacting radial annular faces lapped to extremely flat finishes in order to provide a fluid seal at the interface of the sealing surfaces. One of the sealing elements or sealing rings is nonrotating and is mounted in the housing; the complementary ring is mounted on the shaft or a shaft sleeve for rotation therewith. One of the rings is biased, as by a spring or springs, for axial movement toward the other sealing ring for contact of the complementary faces to form the annular sealing interface. One of the peripheries of the interface being in contact with fluid under pressure in the pump housing and the other periphery being at a lower or atmospheric pressure, there is thus a pressure gradient therebetween, so that a small amount in the form of a very thin film of the fluid may flow across the interface, tending to cool and lubricate the faces, resulting in reduced heat buildup and wear of the sealing surfaces. The thin film flow across the interface may be inadequate to cool and lubricate the surfaces when pumping high temperature fluids, particularly at very high speeds. Alleviation of this problem has been accomplished in the past by pumping a cooling liquid from an auxiliary source through a conduit to a groove or grooves opening into the stationary sealing ring.

SUMMARY OF THE INVENTION

This invention is embodied in a mechanical seal for sealing a rotatable shaft to a wall that separates fluids under different pressures, the wall having an aperture through which the shaft extends, the seal comprising a stationary sealing ring sealingly mounted on the wall encircling the shaft and a rotary sealing ring sealingly mounted on and encircling the shaft, both rings having generally radial annular sealing surfaces, the latter being mated by the disposition of the rings to provide an annular sealing interface and for relative rotation between them, the interface having radially outer and inner peripheries exposed to fluids on opposite sides of the wall; one of the rings is movable axially with respect to the other; with resilient means for restraining it against the axial movement; the rings having a plurality of circumferentially spaced pockets machined to open into the sealing interface. Each ring has an inner and outer series of pockets machined on spaced bolt circles; the bolt circles of each ring are different, so that there is (1) an overlap of the outer pockets in the faces, (2) an overlap of the inner and outer pockets in the faces, and (3) an overlap of the inner pockets in the faces, the overlaps occurring when the rotary seal ring is rotating, providing a transfer of fluid from outer to inner pockets or vice versa, depending on the location of the higher fluid pressure zone, to the interface for positive lubrication of the sealing faces. No path for fluid transfer via the pockets exists when the rotary seal ring is not rotating.

THE DRAWINGS

FIG. 2 is a plan view, on an enlarged scale, of a portion of the rotating sealing ring according to the invention, taken on line 2—2 of FIG. 1;

FIG. 3 is a plan view, taken on line 3—3 of FIG. 1, and looking in the direction of the arrows;

FIG. 4 is a fragmentary sectional view, on an enlarged scale, showing the pocket detail of the sealing rings;

FIG. 5 is a view taken on line 5—5 of FIG. 4; and

FIG. 6 is a view, similar to FIG. 5 showing the overlap of pockets in the sealing faces.

DETAILED DESCRIPTION

Figure 1:
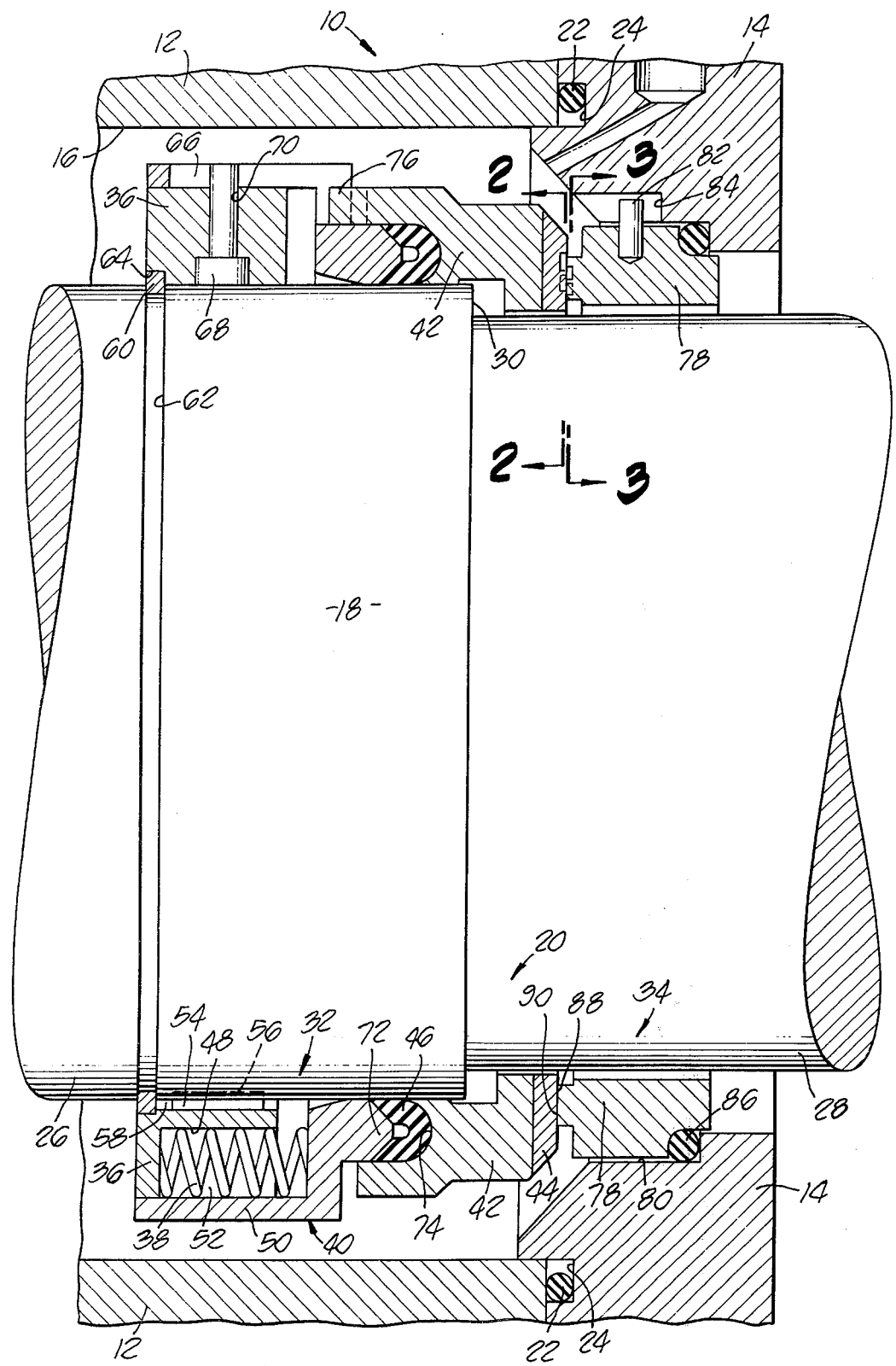
FIG. 1 is a longitudinal cross-sectional view through a portion of a pump housing, showing a mechanical seal and sealing ring according to the invention.

Referring to the drawings, and especially FIG. 1, there is illustrated a preferred embodiment of the invention, in which a housing 10 having housing parts 12 and 14, suitably joined, as by studs or the like (not shown) has a cavity 16 through which a shaft 18 extends. One end of the shaft may be connected to a pump or the like (not shown) while the other end of the shaft may be connected to a motor (also not shown). The cavity 16 usually contains a fluid, such as water or oil. To prevent the passage of the fluid from the cavity 16 where the fluid is at a relatively high pressure along the shaft where the pressure is atmospheric and lower than that in the cavity 16, a mechanical seal assembly, generally identified as 20, is provided. To effectively seal the housing parts together to prevent fluid flow through the joint therebetween, an O-ring seal ring 22 is received in a circular groove 24 in the housing part 14; the groove could be in the housing part 12 if desired.

As illustrated, the shaft 18 has a first section 26 of one diameter and a second section 28 of a smaller diameter providing an annular shoulder 30 therebetween.

The mechanical seal assembly 20 comprises a rotating seal subassembly 32 and a stationary or nonrotating seal subassembly 34.

The rotating seal subassembly 32 comprises a spring holder 36, a plurality of coil springs 38, a U-cup follower 40, a rotating sealing ring 42 having a facing 44 thereon, and a resilient gasket 46 between the U-cup follower 40 and the sealing ring 42.

The spring holder 36 is an annular member encircling the shaft section 26 and has a plurality of circumferentially spaced spring cavities 48 therein which, with an annular skirt 50 of the U-cup follower 40, form a plurality of spring pockets 52, each of which receives a spring 38. The spring holder is fixed for rotation with the shaft 18 by means of a key 54 received in keyways 56 and 58 machined in the shaft 18 and spring holder 36, respectively. To limit axial movement of the spring holder to one direction, a split retaining ring 60 is received in a groove 62 in the shaft 18 and in a groove 64 in the spring holder. The U-cup follower 40 is provided with an axial groove 66 which receives a headed drive pin 68 received in a suitable opening 70 in the spring holder, thus coupling the holder and the follower together for rotation with the shaft 18.

The U-cup follower 40 has an annular nose portion 72 received in an annular groove 74 in the back of the rotating sealing ring 42, and the gasket 46 is located between the nose portion and the back of the sealing ring 42. A tang 76, formed in the sealing ring 42, extends into and is received in the groove 66 in the U-cup follower 40 to couple the rotating sealing ring 42 to the shaft 18 for rotation therewith. The facing 44 on the front of the rotating sealing ring is a hard, wear surface, as will be later described.

The stationary sealing ring subassembly 34 is an annular member encircling the shaft portion 28 and comprises a sealing ring 78 received in an annular recess 80 in the housing portion 14. A drive pin 82 extends from the ring 78 and is received in an open-ended groove 84 in the housing portion 14 to lock the ring 78 against rotation with the shaft 18, yet permit the easy disassembly of the subassembly for repair or cleaning, as is necessary. An O-ring 86 is located in an annular cavity at the rear in the ring 78 to substantially prevent the leakage of fluid to a location behind the ring 78 from the cavity 16.

The sealing rings 42 and 78 have engaging sealing faces 88 and 90, respectively, which are relatively rotatable with respect to one another, the face 88 being on the facing 44 of the ring 42.

The sealing face 88 (see especially FIGS. 4, 5 and 6) on the facing 44 is provided with a plurality of generally evenly, circumferentially spaced outer pockets 92 on an outer annular bolt area 94, and a plurality of generally evenly, circumferentially spaced inner pockets 96 on an inner annular bolt area 98. The pockets 92 and 96 are staggered with respect to one another.

The sealing face 90 is provided with a plurality of generally evenly, circumferentially spaced outer pockets 100 on an outer annular bolt area 102 and a plurality of generally evenly, circumferentially spaced inner pockets 104 on an inner annular bolt area 106. The pockets 100 and 104 are staggered with respect to one another.

The outer bolt areas 94 and 102 overlap one another. The outer bolt area 102 overlaps the inner bolt area 98, and the inner bolt areas 98 and 106 overlap one another. Thus, at some positions of the faces 88 and 90, a pocket 92 communicates with a pocket 100; at another position, a pocket 100 communicates with a pocket 96; and, at still another position, a pocket 96 communicates with a pocket 104. Thus, at some intervals of time during the relative rotation of the rings 42 and 78, fluid trapped in pockets 92 is transferred to pockets 100, which in turn is transferred to pockets 96, which in turn is transferred to pockets 104 and then finds its way through the sealing faces to a zone of lower pressure in the housing 14. The faces of the sealing ring are exposed to the fluid trapped in the pockets, providing positive lubrication of the seal faces. Because of the flow of the fluid across the faces, the faces are also cooled.

Whereas the preferred embodiment has been described with the zone of lower pressure as being in the housing 14, the invention is equally applicable to a seal arrangement having the higher pressure radially inwardly of the seal rings or in the housing 14, so that the fluid flow across the seal faces if toward the cavity 16. The arrangement of pockets in such an embodiment, as seen in FIG. 5 would then be transposed.

The sealing rings 42 and 78 can be made of conventional materials, such as, for example, stainless steel and graphite, respectively. The facing 44 is a wear-resistant material, such as stellite or the like, which can be replaced if worn or damaged. This also permits the use of less expensive material for the sealing ring 42.

I claim:

1. In a mechanical seal assembly for sealing a rotatable shaft to a housing, said seal assembly having a rotating seal subassembly and a stationary seal subassembly, said subassemblies each having a sealing ring with sealing faces in contact with one another, said sealing rings being exposed to a fluid which leaks across said sealing faces from a higher pressure zone to a lower pressure zone and provides limited lubrication and cooling of said faces, the improvement which comprises:

at least one pocket in each of said sealing faces, said pocket in one sealing face being located radially outwardly of the pocket in the other sealing face and exposed to said fluid in said housing and being in intermittent communication with the pocket in the other sealing face located radially inwardly of said pocket in said one sealing face during rotation of said sealing rings and their sealing faces, whereby fluid in a pocket in one sealing face is transferred to a pocket in the other sealing face when said pockets are in communication, said pockets being exposed to the other sealing face at other times, thus providing a radial path for fluid from said higher pressure zone to said lower pressure zone and across said sealing faces to provide improved lubrication and cooling thereof during relative rotation therebetween.

2. In a mechanical seal assembly as recited in claim 1 wherein the radial path for said fluid is inwardly toward said shaft.

3. In a mechanical seal assembly as recited in claim 1 wherein the radial path for said fluid is outwardly from said shaft.

4. In a mechanical seal assembly for sealing a rotatable shaft to a housing, said seal assembly having a rotating seal subassembly and a stationary seal subassembly, said subassemblies each having a sealing ring with sealing faces in contact with one another, said sealing rings being exposed to a fluid in said housing which leaks across said sealing faces from a higher pressure zone to a lower pressure zone and provides limited lubrication and cooling of said faces, the improvement which comprises:

at least one pocket in each of said sealing faces, said pocket in one sealing face being located radially outwardly of the pocket in the other sealing face and exposed to said fluid in said housing and being in intermittent communication with the pocket in the other sealing face located radially inwardly of said pocket in said one sealing face during rotation of said sealing rings and their sealing faces, whereby fluid in said pocket in said one sealing face is transferred to said pocket in said other sealing face when said pockets are in communication, and exposed to said other sealing face at other times, thus providing a path radially inwardly for fluid from said higher pressure zone to said lower pressure zone in said housing across said sealing faces to provide improved lubrication and cooling thereof during relative rotation therebetween.

5. In a mechanical seal assembly as recited in claim 4, in which a plurality of pockets in each sealing face.

6. In a mechanical seal assembly as recited in claim 5 further comprising two series of pockets in each sealing face, one series being substantially equally spaced from the axis of said shaft and the other series of pockets being substantially equally spaced from the axis of said shaft and radially inwardly from said one series of pockets, the pockets in one sealing face being radially spaced differently from the pockets in the other sealing face and in such manner that upon relative rotation between said faces, a path of fluid transfer is established radially inwardly across said sealing faces.

7. In a mechanical seal assembly as recited in claim 6, in which said pockets are so spaced relative to one another that a path of fluid transfer is established across said sealing faces only when there is relative rotation therebetween.

8. A mechanical seal assembly for sealing a rotary shaft to a housing containing a fluid having a shaft opening through which the shaft extends, said mechanical seal assembly having:

a rotatable sealing ring mounted on the shaft to be rotated therewith, said sealing ring having limited movability axially of the shaft;

a stationary sealing ring fixed with respect to the housing;

said sealing rings having opposed, generally radial surfaces in relatively rotatable sealing relationship;

the surface of said movable sealing ring being of a material different from the body thereof; and pockets in each sealing surface to trap fluid therein and when rotating relative to one another, to transfer fluid across the sealing faces radially inwardly to effect lubrication and cooling of said sealing faces, said pockets being effective to transfer fluid only when there is relative rotation between said surfaces.

* * * * *